Feb. 22, 1966 W. O. RIGGS 3,235,896
DOCKBOARD
Filed Nov. 18, 1963
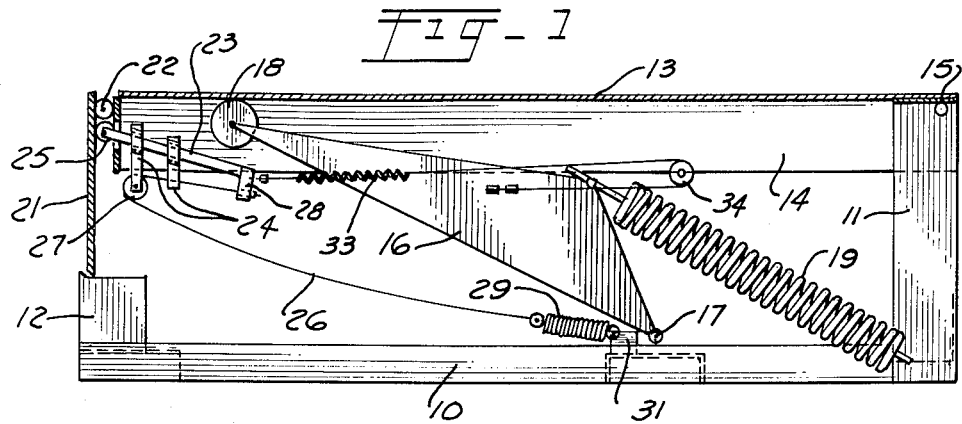
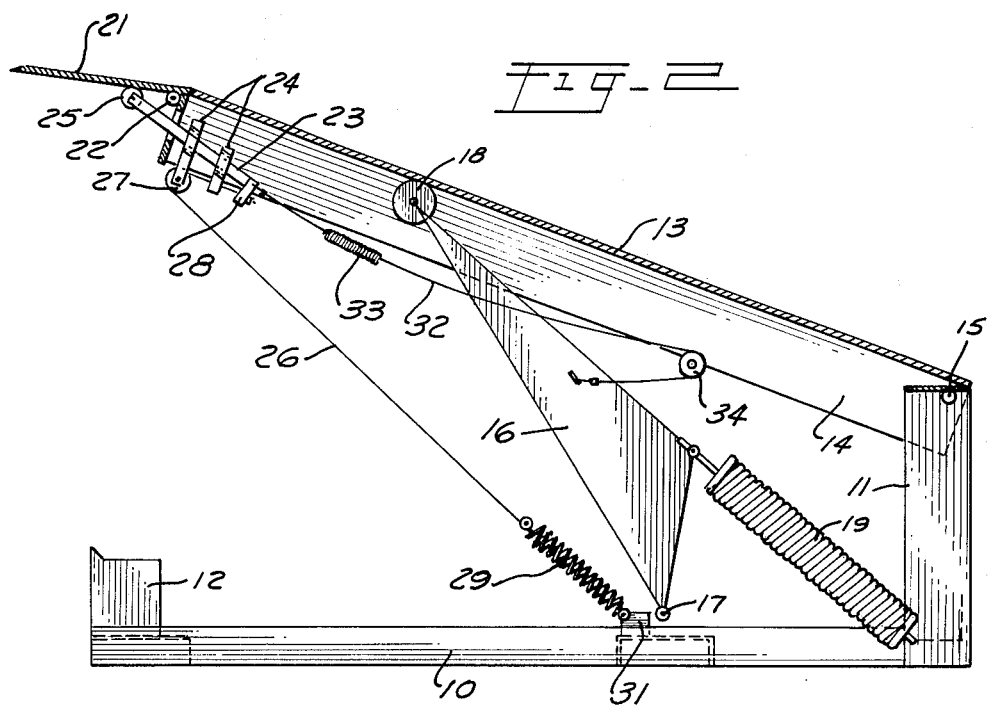
INVENTOR.
WILLIE OTIS RIGGS
BY Bair, Freeman
& Molinare ATTORNEYS

United States Patent Office 3,235,896
Patented Feb. 22, 1966

3,235,896
DOCKBOARD
Willie Otis Riggs, Springfield, Tenn., assignor to Unarco Industries, Inc., Chicago, Ill., a corporation of Illinois
Filed Nov. 18, 1963, Ser. No. 324,316
7 Claims. (Cl. 14—71)

This invention relates to dockboards and more particularly to operating and control mechanism for a pivoted lip on a dockboard.

Dockboards as heretofore constructed have generally been provided either with mechanical means for raising and controlling a pivoted lip at the outer end thereof or with hydraulic means for this purpose. One such mechanism utilizing hydraulic means has been highly satisfactory. Such hydraulic mechanisms, however, are relatively expense and it is desirable to have a simplified mechanical mechanism for use on relatively small boards or on boards used in certain types of installations where the cost of the hydraulic mechanism cannot be justified.

Mechanical lip control means as heretofore constructed have generally used tension cables to raise the lip when the board is raised and a separate mechanical latch for holding the lip raised and which is released either manually or automatically when the board is lowered to bring the lip into engagement with a truck bed. In such mechanisms, the latch cannot engage unless the board is raised to its maximum upward position. Furthermore, the necessity for a separate latch mechanism complicates the structure and increases its cost.

It is accordingly an object of the present invention to provide a dockboard in which the lip is mechanically operated and controlled by a single lip lifting bar which serves both to raise or extend the lip and to hold it in its raised position.

Another object is to provide a dockboard in which the lip lifting bar is extended to raise the lip by a tension element, such as a cable, when the board is raised and which is retracted to free the lip by a second tension element when the board is lowered.

According to a feature of the invention, the second tension element includes a spring so that the bar will not be retracted until the spring has stretched sufficiently to overcome the friction of the bar thereby insuring that the board will be lowered sufficiently to engage the lip with the body of a truck before the bar is retracted.

According to another feature of the invention, the lip lifting bar slides at an acute angle to the board upwardly and outwardly from the end thereof so that it can raise the lip to the desired extent without excessive travel. The angle is small enough so that the weight of the lip acting on the bar will not slide it back to its retracted position but requires positive retraction of the bar for this purpose.

The above and other objects and features of the invention will be more readily apparent from the following description when read in connection with the accompanying drawings, in which:

FIG. 1 is a side elevation with parts in section of a dockboard embodying the invention in its lowered position, and FIG. 2 is a similar view showing the board in its raised position.

The dockboard, as illustrated, comprises a frame having a horizontal portion 10 and a vertical back portion 11, together with a short front piece 12. The frame, as is conventional, is set into a concrete dock or a dock of other structural form to be firmly fixed in place therein.

The dockboard itself comprises a flat plate 13 which is preferably formed of sheet steel, or the like, and which may be reinforced by longitudinally extending beams 14. At its rear end the dockboard is pivoted on an axis 15 to the top of the frame upright 11 to swing in a vertical plane.

The dockboard is normally urged upwardly by a spring mechanism shown as comprising one or more lifting arms 16 which are preferably triangular in shape, as shown. The lifting arms are pivoted at their lower ends at 17 to the horizontal frame part 10 and at their upper ends carry rollers 18 which engage the under surface of the board 13. Springs 19 connected to intermediate parts in the levers 16 urge them clockwise, as shown, to raise the board 13. Latching mechanism is provided to hold the board in its normal inoperative position, as shown in FIG. 1, and which may be released to permit the board to raise to the position shown in FIG. 2. This latching mechanism may take the form of any desired type of mechanical or hydraulic latching mechanism, but since it forms no part of the present invention it is not illustrated herein.

At the outer end of the board a lip 21 is pivoted thereto on a hinge axis 22 to swing from a dependent position, as shown in FIG. 1, to a raised position, as shown in FIG. 2, in which it forms substantially an extension of the board 13. The hinge is preferably positioned, as shown, at a point spaced from the edge of the lip and from the edge of the board so that when the lip is raised its edge will contact the edge of the board to limit raising movement of the lip. The lip is, however, free to swing downwardly to its dependent position. It will be noted that in the dependent position the lower edge of the lip rests on the frame member 12 to assist in positioning the board in its desired neutral position in which it is substantially flush with the dock top and is out of the way of trucks backing into the dock.

When the board is raised to the position shown in FIG. 2, the lip is automatically swung outward to its raised position. For this purpose, a lip lifting bar 23 is slidably mounted in brackets 24 adjacent to the free end of the board 13. As shown, the bar is slidable through the brackets at an acute angle to the plane of the board 13 so that it will extend beyond and upwardly from the outer end of the board. The outer end of the board preferably carries a roller 25 which rides over the lower surface of the lip 21 to minimize friction.

To move the lifting bar outwardly to its lip raising position, means are provided which respond to raising of the board 13. As shown, a flexible cable or similar tension element 26 extends over a sheave 27 preferably carried by the outermost bracket 24 and is connected to a cross head 28 at the inner end of the lifting bar 23. The other end of the cable 26 is connected through a tension spring 29 to a bracket 31 on the lower frame member 10 spaced inwardly from the outer end of the frame.

When the board 13 is lowered, as shown in FIG. 1, cable 26 will be relatively slack, as indicated, and will exert no force on the lip lifting bar. However, as the board 13 is swung upwardly to the position shown in FIG. 2, the cable will be tensioned and will slide the bar forwardly to raise the lip. The provision of the spring 29 insures that the board 13 may move to its full upper position without being stopped by the cable and without straining any of the parts. Preferably the strength of the spring 29 is such that it will not slide the bar forwardly to raise the lip until it has been stretched to some degree so that the board 13 can move almost to its complete upper position before the lip is raised. This insures that the lip will clear the bed of a truck backed up adjacent to the dock before swinging upwardly, but even though the lip should tend to swing up and engage the truck bed, the spring 29 can yield to permit continued upward movement of the board without damaging any of the parts.

After the board has been raised and is again lowered, to bring the lip into engagement with the truck bed, it is desired to retract the lifting bar so that when the truck pulls away from the dock the lip can drop freely to its dependent position, as shown in FIG. 1. For this purpose, a second cable 32 is provided connected to the head 28 through a tension spring 33. The cable 32 is threaded over a sheave 34 mounted on the board 13 or on one of the reinforcing beams 14 therefor remote from the free end of the board. The cable is then attached to the lifting arm 16, as shown.

When the board is raised, as illustrated in FIG. 2, the lifting arm is moved clockwise from its stored position thereby slacking the cable 32 so that the lifting bar 23 can be moved outward without interference by the cable 26. However, when the board is moved downwardly, as by an operator walking out on the board or a truck running over it, the cable 26 will in turn be slacked and the lifting arm 16 will move counter-clockwise to tension the cable 32. The strength of the spring 33 is preferably so selected that it will yield initially as the cable 32 is tensioned without retracting the lift bar 23 against the friction of the bar in the guides 24 under the load imposed on the outer end of the bar by the weight of the lip. Upon continued downward movement of the board, however, the cable 32 and spring 33 will exert sufficient force on the bar 23 to shift it back to its retracted position, as shown in FIG. 1.

The lifting bar will remain in its retracted position during use of the dockboard and while the lip is supported on a truck bed during a loading or unloading operation. However, when the truck pulls away from the dock, the lip will drop freely to its dependent position, as shown in FIG. 1, and the dockboard may again be latched in this position substantially flush with the dock surface.

While one embodiment of the invention has been shown and described herein, it will be understood that it is illustrative only and not to be taken as a definition of the scope of the invention, reference being had for this purpose to the appended claims.

What is claimed is:

1. A dockboard comprising a board member pivoted at one end on a horizontal axis for vertical swinging of its other end, a lip pivoted on the other end of the board for swinging from a dependent position to an extended position projecting beyond said other end of the board, a lip lifting bar slidably mounted on the board adjacent to its said other end for sliding lengthwise of the board from a retracted position in which its outer end is adjacent to the end of the board to an extended position in which it projects beyond the other end of the board to engage and raise the lip to its extended position, means connected to said bar operated by raising of said other end of the board to move the lip lifting bar from its retracted toward its extended position, and means connected to the bar and operated by movement of the other end of the board to a predetermined position below its maximum raised position to move the bar to its retracted position.

2. The dockboard of claim 1 in which the lip lifting bar slides at an acute angle to the plane of the board upwardly and outwardly from said other end of the board.

3. A dockboard comprising a board member pivoted at one end on a horizontal axis for vertical swinging of its other end, a lip pivoted on the other end of the board for swinging from a dependent position to an extended position projecting beyond said other end of the board, a lip lifting bar slidably mounted on the board adjacent to its said other end for lengthwise sliding from a retracted position adjacent to the other end of the board to an extended position in which it projects beyond the other end of the board to engage and raise the lip to its extended position, a sheave mounted adjacent to said other end of the board, a tension element secured at one end to a fixed point beneath the board and passing over the sheave and secured at its other end to the inner end of the bar to move the bar to its extended position when the other end of the board is raised, a second tension element connected to the bar and extending therefrom toward said one end of the board, and means operable when the other end of the board is lowered to a predetermined position below its maximum raised position to tension the second tension element thereby to move the bar to its retracted position.

4. A dockboard comprising a substantially L-shaped frame, a board pivoted at one end to the top of the vertical frame leg and overlying the horizontal frame leg, a lifting arm pivoted on the frame and engaging the bottom of the board to raise it, a spring connected to the arm urging it in a direction to raise the board, a lip pivoted on the other end of the board for swinging from a dependent position to an extended position projecting beyond the other end of the board, a lip lifting bar slidably mounted on the board adjacent to said other end for lengthwise sliding from a retracted position to an extended position in which it projects beyond the end of the board to engage and raise the lip to its extended position, means connected to the bar operated by raising of the board to move the bar to its extended position, a sheave carried by the board remote from said other end thereof, and a tension element passing over the sheave with one end connected to the bar and the other end to the lifting arm to move the bar to its retracted position when the board is lowered, said tensions element being slack to delay retraction of said bar until the board has been lowered to a predetermined position below its maximum raised position.

5. The dockboard of claim 4 in which the lifting bar slides at an acute angle to the plane of the board upwardly and outwardly from the board.

6. The dockboard of claim 4 in which the tension element includes a spring whereby the tension element will not retract the bar until the board has been lowered substantially below its raised position.

7. A dockboard comprising a substantially L-shaped frame, a board pivoted at one end to the top of the vertical frame leg and overlying the horizontal frame leg, a lifting arm pivoted on the frame and engaging the bottom of the board to raise it, a spring connected to the arm urging it in a direction to raise the board, a lip pivoted on the other end of the board for swinging from a dependent position to an extended position projecting beyond the other end of the board, a lip lifting bar slidably mounted on the board adjacent to said other end for lengthwise sliding from a retracted position to an extended position in which it projects beyond the end of the board to engage and raise the lip to its extended position, a pair of sheaves on the board, one adjacent to said other end thereof and the other remote from said other end, a first tension element passing over said one sheave with one end secured to the frame and the other end connected to the bar to move it to its extended position when the board is raised, and a second tension element passing over the other sheave with one end secured to the lifting arm and the other end to the bar to retract the bar when the board is lowered, said tension element being slack to delay retraction of said bar until the board has been lowered to a predetermined position below its maximum raised position.

References Cited by the Examiner

UNITED STATES PATENTS 3,117,332  1/1964  Kelley _____ 14—71
3,167,796  2/1965  Layne _____ 14—71

JACOB L. NACKENOFF, *Primary Examiner.*